United States Patent
Chen et al.

(10) Patent No.: US 12,439,092 B2
(45) Date of Patent: Oct. 7, 2025

(54) NETWORK BASED IMAGE FILTERING FOR VIDEO CODING

(71) Applicant: BEIJING DAJIA INTERNET INFORMATION TECHNOLOGY CO., LTD., Beijing (CN)

(72) Inventors: Wei Chen, San Diego, CA (US); Xiaoyu Xiu, San Diego, CA (US); Yi-Wen Chen, San Diego, CA (US); Hong-Jheng Jhu, San Diego, CA (US); Che-Wei Kuo, Beijing (CN); Xianglin Wang, San Diego, CA (US); Bing Yu, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 87 days.

(21) Appl. No.: 18/205,475

(22) Filed: Jun. 2, 2023

(65) Prior Publication Data
US 2023/0328293 A1   Oct. 12, 2023

Related U.S. Application Data

(63) Continuation of application No. PCT/US2021/062061, filed on Dec. 6, 2021.
(Continued)

(51) Int. Cl.
*H04N 19/80* (2014.01)
*G06N 3/045* (2023.01)
(Continued)

(52) U.S. Cl.
CPC .............. *H04N 19/80* (2014.11); *G06N 3/045* (2023.01); *G06N 3/0464* (2023.01);
(Continued)

(58) Field of Classification Search
None
See application file for complete search history.

(56) References Cited

U.S. PATENT DOCUMENTS 10,547,823 B2 * 1/2020 Chaudhuri ............. H04N 13/15
11,483,591 B2 * 10/2022 Auyeung ............. H04N 19/186
(Continued)

FOREIGN PATENT DOCUMENTS

EP          4222968 A1      8/2023
KR     1020200063779 A      6/2020
WO    WO-2022106014 A1 *   5/2022  ........... H04N 19/147

OTHER PUBLICATIONS

International Search Report issued in Application No. PCT/US2021/062061, dated Mar. 30, 2022,(2p).
(Continued)

*Primary Examiner* — Tyler W. Sullivan
(74) *Attorney, Agent, or Firm* — Arch & Lake LLP

(57) ABSTRACT

A method and an apparatus for image filtering in video coding using a neural network are provided. The method includes: loading a plurality of input patches associated with a current image to be coded, where the plurality of input patches include a first input patch with a first resolution, a second input patch with a second resolution, and a third input patch with a third resolution; and in response to determining that one resolution in the first resolution, the second resolution, and the third resolution is different from the other two resolutions, adjusting the first resolution, the second resolution, and the third resolution at one region of a plurality of regions before the neural network or in the neural network.

19 Claims, 14 Drawing Sheets

Related U.S. Application Data

(60) Provisional application No. 63/121,822, filed on Dec. 4, 2020.

(51) Int. Cl.
  *G06N 3/0464* (2023.01)
  *G06T 3/4046* (2024.01)
  *H04N 19/124* (2014.01)
  *H04N 19/42* (2014.01)
  *G06N 3/048* (2023.01)

(52) U.S. Cl.
  CPC ......... *G06T 3/4046* (2013.01); *H04N 19/124* (2014.11); *H04N 19/42* (2014.11); *G06N 3/048* (2023.01)

(56) References Cited

U.S. PATENT DOCUMENTS

| | | | |
|---|---|---|---|
| 11,825,101 B2* | 11/2023 | Chen | G06N 3/04 |
| 2019/0156502 A1 | 5/2019 | Lee et al. | |
| 2020/0092552 A1* | 3/2020 | Coelho | H04N 19/147 |
| 2020/0162715 A1 | 5/2020 | Chaudhuri et al. | |
| 2020/0252654 A1 | 8/2020 | Su et al. | |
| 2020/0374525 A1 | 11/2020 | Gao et al. | |
| 2020/0374552 A1 | 11/2020 | Skupin et al. | |
| 2021/0049468 A1* | 2/2021 | Karras | G06V 40/168 |
| 2024/0064296 A1* | 2/2024 | Chen | G06N 3/0985 |

OTHER PUBLICATIONS

EPOA issued in Application No. 21901617.7 dated Jan. 29, 2025, (18p).

Tsung-Chuan Ma et al., "AHG11: In-loop filtering based on neural network", Joint Video Experts Team (JVET) of ITU-T SG 16 WP 3 and ISO/IEC JTC 1/SC 29, JVET-T0094_r1, 20th Meeting, by teleconference, Oct. 7-16, 2020, (3p).

Mingze Wang et al., "An Integrated CNN-based Post Processing Filter for Intra Frame in Versatile Video Coding", 2019 Asia-Pacific Signal and Information Processing Association Annual Summit and Conference (APSIPA ASC), IEEE, Nov. 18, 2019, (5p).

Yu-Ling Hsiao et al., "CE10-1.2: Convolutional neural network loop filter", Joint Video Experts Team (JVET) of ITU-T SG 16 WP 3 and ISO/IEC JTC 1/SC 29/WG 11, JVET-O0056-v1, 15th Meeting: Gothenburg, SE, Jul. 3-12, 2019, (5p).

Yuan Zhou et al., "Image super-resolution based on dense convolutional auto-encoder blocks", Neurocomputing 423 (2021) 98-109, (12p).

Camilo Pestana, "Adversarial Perturbations Prevail in the Y-Channel of the YCbCr Color Space", arXiv:2003.00883v1 [cs.CV] Feb. 25, 2020, (9p).

Xi Zhang et al., "Ultra High Fidelity Deep Image Decompression With—Constrained Compression", IEEE Transactions on Image Processing, vol. 30, 2021, 963-975, (13p).

* cited by examiner

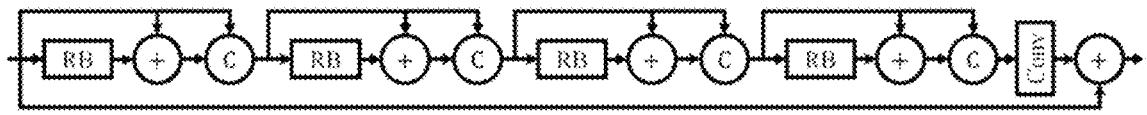
FIG. 8B
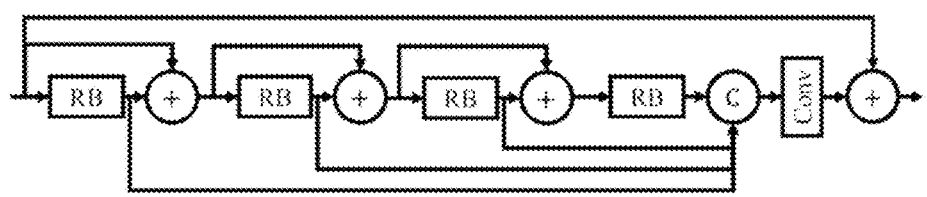
FIG. 8C
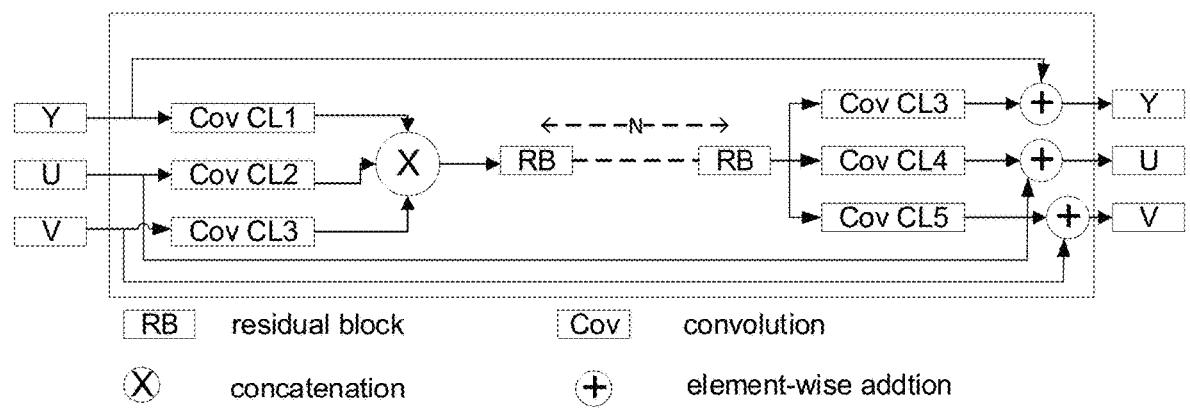
FIG. 9

Load a plurality of input patches associated with a current image to be coded, wherein the plurality of input patches comprise a first input patch with a first resolution, a second input patch with a second resolution, and a third input patch with a third resolution
1301

Adjust the first resolution, the second resolution, and the third resolution at one region of a plurality of regions before or in the neural network in response to determining that one resolution in the first, second, and third resolutions is different from the other two resolutions
1302

FIG. 13

Load a plurality of input patches associated with a current image to be coded, wherein the plurality of input patches comprise a first input patch with a first resolution, a second input patch with a second resolution, and a third input patch with a third resolution
1301

Down-sample the first input patch into a plurality of first input sub-patches having same resolution as the second or third patch using the plurality of input layers in the first region in response to determining that one resolution in the first, second, and third resolutions is different from the other two resolutions
1402

Combine the plurality of first input sub-patches with the second and third input patches
1403

Generate a plurality of output patches corresponding to the plurality of input patches, wherein the plurality of output patches comprise a plurality of first output sub-patches, a second output patch, and a third output patch
1404

Up-sample the plurality of first output sub-patches using the plurality of output layers in the first region
1405

FIG. 14

NETWORK BASED IMAGE FILTERING FOR VIDEO CODING

CROSS-REFERENCE TO RELATED APPLICATION

The present application is a continuation application of PCT Application No. PCT/US2021/062061, filed on Dec. 6, 2021, which claims priority to U.S. Provisional Application No. 63/121,822, entitled "Neural Network Based Image Filtering for Video Coding," filed on Dec. 4, 2020, the entirety of which is incorporated by reference for all purposes.

FIELD

The present disclosure relates to video coding, and in particular but not limited to, methods and apparatus on video coding using neural network based model filtering.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. one Joint Video Exploration Team (WET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

The joint call for proposals (CfP) on video compression with capability beyond HEVC was issued by ITU-T and ISO/IEC. 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). One reference software codebase, called VVC test model (VTM), was established for demonstrating a reference implementation of the VVC standard.

SUMMARY

The present disclosure provides examples of techniques relating to improving the video coding efficiency by using neural network based model filtering.

According to a first aspect of the present disclosure, there is provided a method for image filtering in video coding using a neural network. The method includes: loading a plurality of input patches associated with a current image to be coded, where the plurality of input patches include a first input patch with a first resolution, a second input patch with a second resolution, and a third input patch with a third resolution; and in response to determining that one resolution in the first, second, and third resolutions is different from the other two resolutions, adjusting the first resolution, the second resolution, and the third resolution at one region of a plurality of regions before or in the neural network.

According to a second aspect of the present disclosure, there is provided an apparatus for image filtering in video coding using a neural network. The apparatus includes one or more processors and a memory configured to store instructions executable by the one or more processors. Further, the one or more processors, upon execution of the instructions, are configured to: load a plurality of input patches associated with a current image to be coded, where the plurality of input patches include a first input patch with a first resolution, a second input patch with a second resolution, and a third input patch with a third resolution; and in response to determining that one resolution in the first, second, and third resolutions is different from the other two resolutions, adjust the first resolution, the second resolution, and the third resolution at one region of a plurality of regions in the neural network.

According to a third aspect of the present disclosure, there is provided a non-transitory computer-readable storage medium storing computer-executable instructions that, when executed by one or more computer processors, causing the one or more computer processors to perform the method according to the first aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 8B illustrates another example of ResNet stacks multiple residual blocks in order to further improve the video coding efficiency in accordance with some implementations in the present disclosure.

FIG. 8C illustrates another example of ResNet tackling single-image super-resolution (SISR) by aggregating the output of residual blocks in accordance with some implementations in the present disclosure.

FIG. 9 illustrates a typical neural network based model to perform image filtering for video coding in accordance with some implementations in the present disclosure.

FIG. 13 is a flowchart illustrating a process for image filtering in video coding using a neural network in accordance with some implementations of the present disclosure.

FIG. 14 is a flowchart illustrating an example process for image filtering in video coding using a neural network in accordance with the present disclosure.

DETAILED DESCRIPTION

Figure 1:
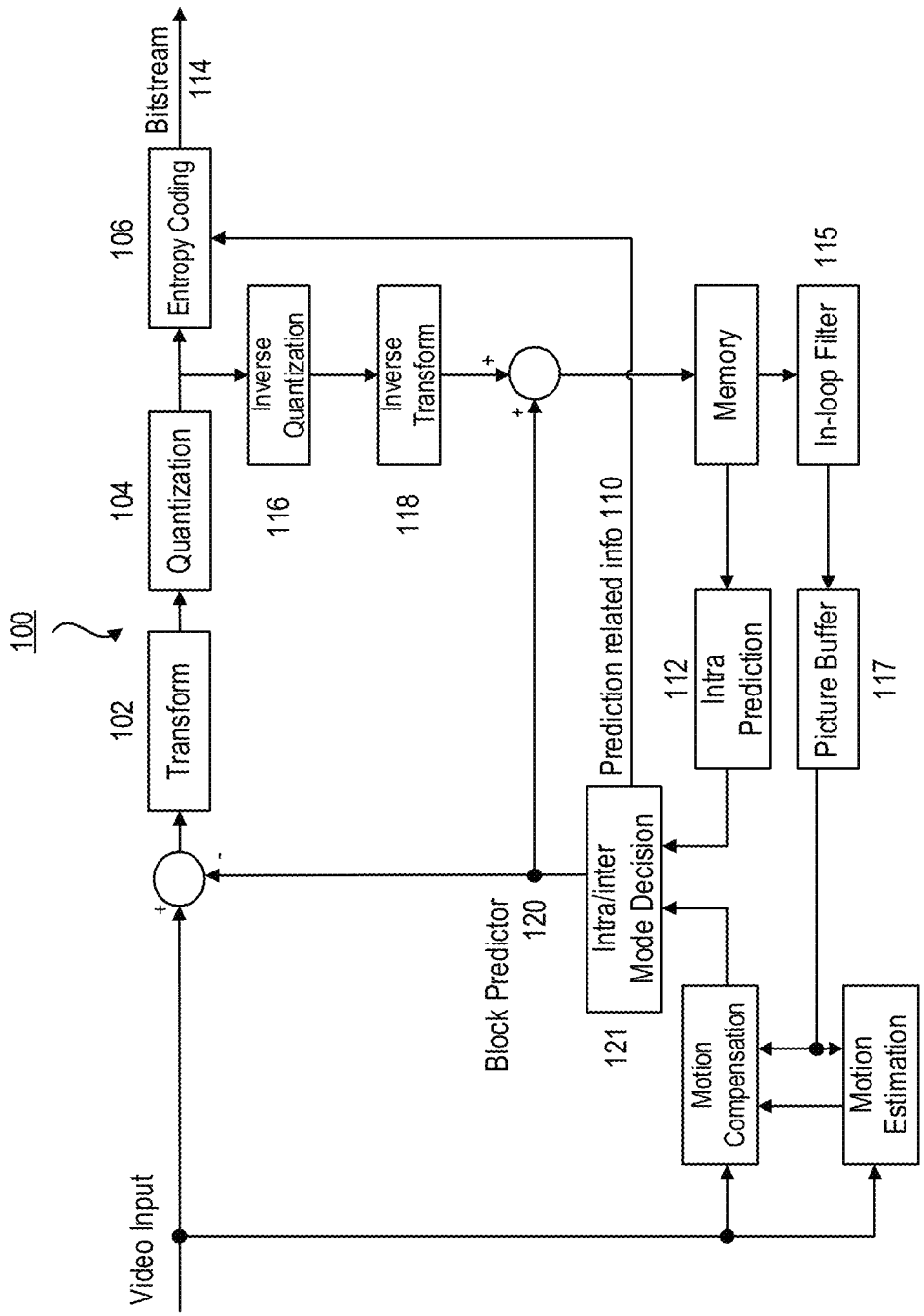
FIG. 1 is a block diagram illustrating a block-based video encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Like HEVC, VVC is built upon the block-based hybrid video coding framework. FIG. 1 is a block diagram illustrating a block-based video encoder in accordance with some implementations of the present disclosure. In the encoder 100, the input video signal is processed block by block, called coding units (CUs). In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figures 3A, 3B, 3C:
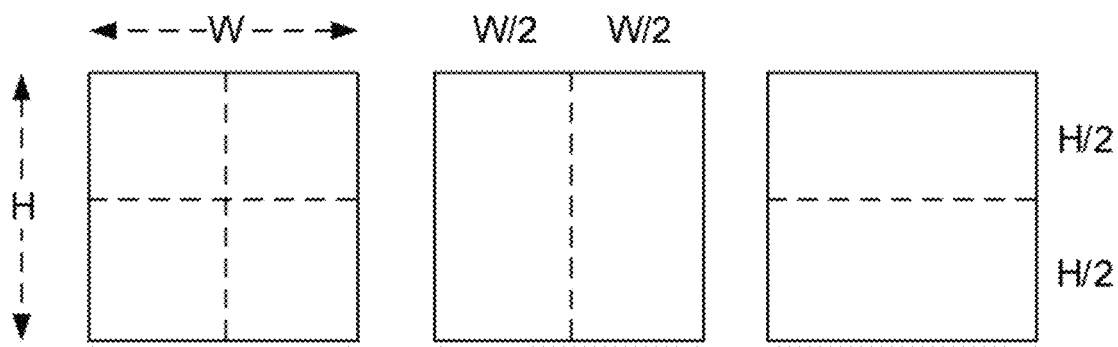
FIG. 3A is schematic diagram illustrating quaternary partitioning tree splitting mode in accordance with some implementations of the present disclosure.
FIG. 3B is schematic diagram illustrating vertical binary partitioning tree splitting mode in accordance with some implementations of the present disclosure.
FIG. 3C is schematic diagram illustrating horizontal binary partitioning tree splitting mode in accordance with some implementations of the present disclosure.
Figures 3D, 3E:
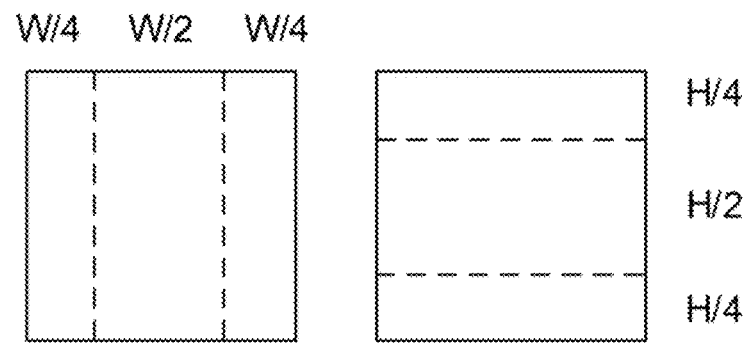
FIG. 3D is schematic diagram illustrating vertical ternary partitioning tree splitting mode in accordance with some implementations of the present disclosure.
FIG. 3E is schematic diagram illustrating horizontal ternary partitioning tree splitting mode in accordance with some implementations of the present disclosure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
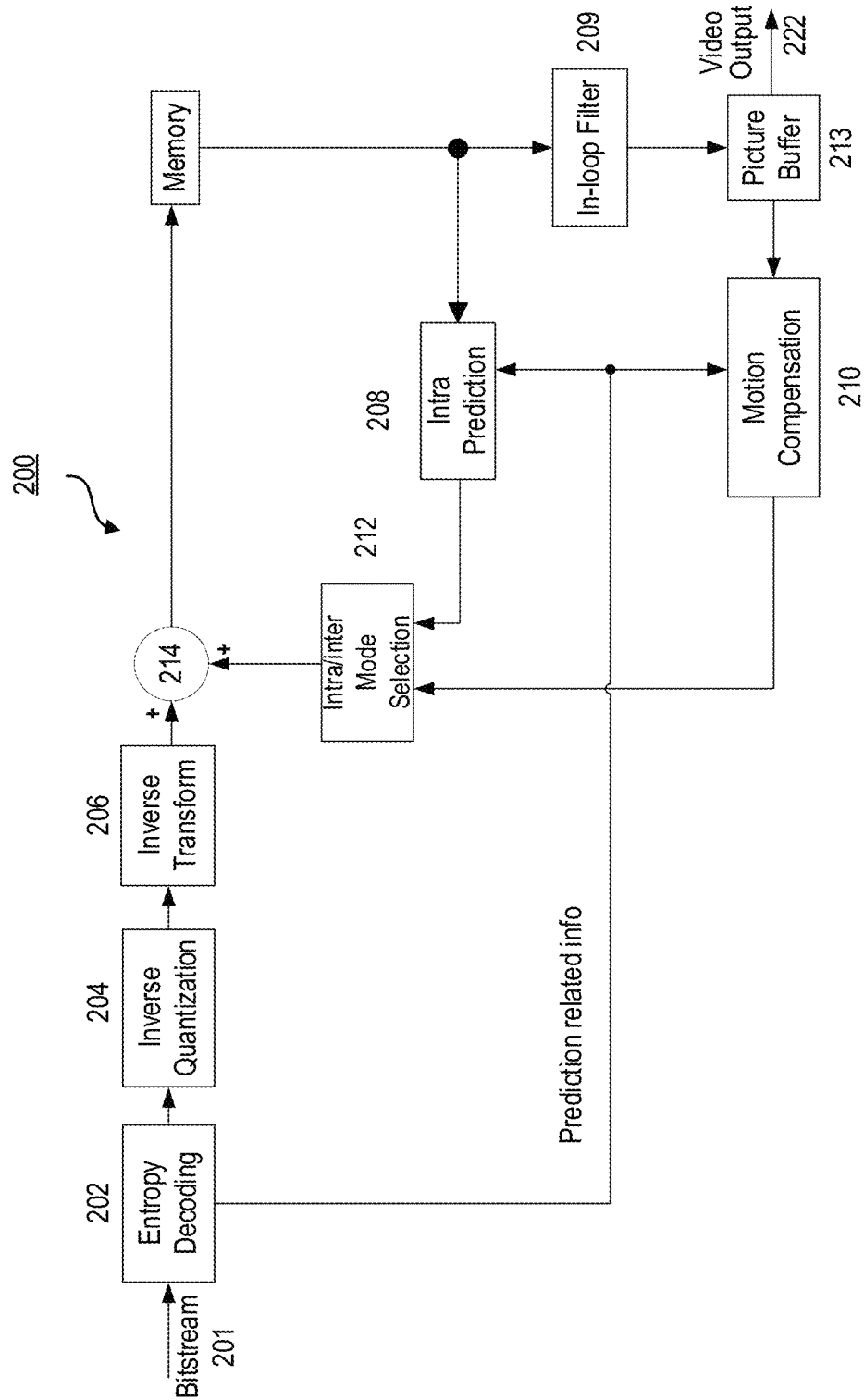
FIG. 2 is a block diagram illustrating a block-based video decoder in accordance with some implementations of the present disclosure.

FIG. 2 is a block diagram illustrating a block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

The present disclosure is to improve the image filtering design of the above-mentioned video coding standards or techniques. The proposed filtering method in the present disclosure is neural network based, which may be applied as part of the in-loop filtering, e.g., between the deblocking filter and sample adaptive offset (SAO), or as part of post-loop filtering to improve the current video coding techniques, or as part of post-processing filtering after the current video coding techniques.

The neural network techniques, e.g., fully connected neural network (FC-NN), convolutional neural network (CNN), and long short-term memory network (LSTM), have already achieved significant success in many research domains, including computer vision and video understanding.

Fully-Connected Neural Network (FC-NN)

Figure 4:
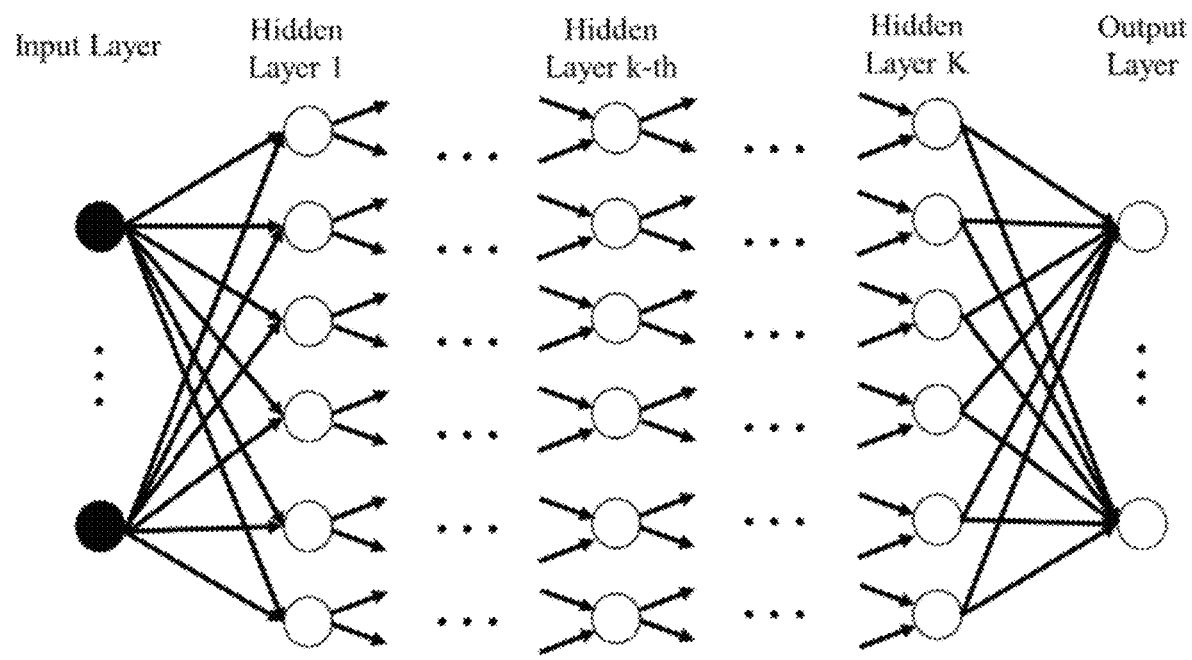
FIG. 4 illustrates a simple fully connected neural network (FC-NN) consisting of input layer, output layer, and multiple hidden layers in accordance with some implementations of the present disclosure.

FIG. 4 illustrates a simple FC-NN consisting of input layer, output layer, and multiple hidden layers in accordance with some implementations of the present disclosure. At k-th layer, the output $f^k(x^{k-1}, W^k, B^k)$, is generated by $$f^k(x^{k-1}, W^k, B^k) = \delta(x^{k-1} * W^k + B^k) \quad (1)$$

$$x^{k-1} * W^k + B^k = [x_1^{k-1}, \ldots, x_j^{k-1}, \ldots, x_M^{k-1}] \cdot \begin{bmatrix} W_{1,1}^k & \cdots & W_{0,N}^k \\ \vdots & \ddots & \vdots \\ W_{M,1}^k & \cdots & W_{M,N}^k \end{bmatrix} + \quad (2)$$

$$[B_1^{k-1}, \ldots, B_j^{k-1}, \ldots, B_M^{k-1}]$$

where $x^{k-1} \in R^M$ is the output of (k−1)-th layer, $W^k \in R^{M*N}$ and $B^k \in R^N$ are the weight and the bias at k-th layer. $\delta(\cdot)$ is the activation function, e.g., the Rectified Linear Unit (ReLU) function as defined in Eq. (3).

$$\delta(x) = \begin{cases} 0, & x < 0 \\ x, & x \geq 0 \end{cases} \quad (3)$$

Therefore, the general form of a K-layer FC-NN is written as $$FCNN(x) = f^K(\ldots f^k(f^{k-1}(\ldots f^1(x, W^1, B^1)\ldots), W^k, B^k)\ldots, W^K, B^K), \text{ for } 1 \leq k \leq K \quad (4)$$

According to the universal approximation hypothesizes and Eq. (4), given any continuous function g(x) and some ε>0, there exists a neural network f(x) with a reasonable choice of non-linearity e.g., ReLU, such that ∀x, |g(x)−f(x)|<ε. Therefore, many empirical studies applied neural network as an approximator to mimic a model with hidden variables in order to extract explainable features under the surfaces. For example, applying in image recognition, FC-NN helps researchers to construct a system that understands not just a single pixel, but increasingly much deeper and complex sub-structures, e.g., edges, textures, geometric shapes, and objects.

Convolutional Neural Network (CNN)

Figure 5A:
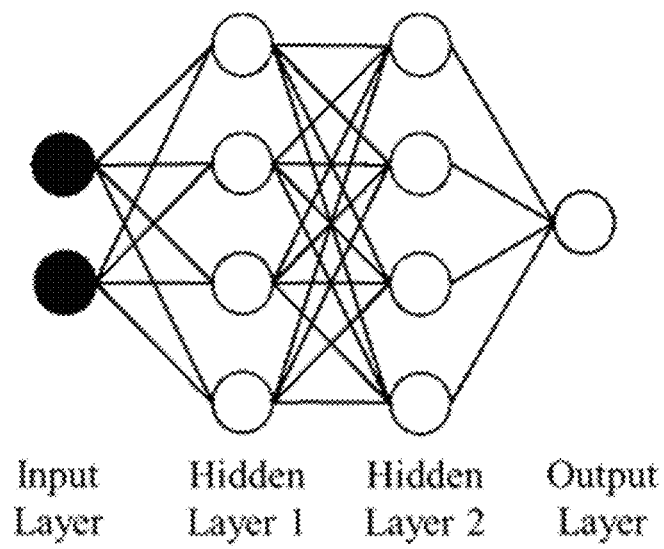
FIG. 5A illustrates an FC-NN with two hidden layers in accordance with some implementations of the present disclosure.
Figure 5B:
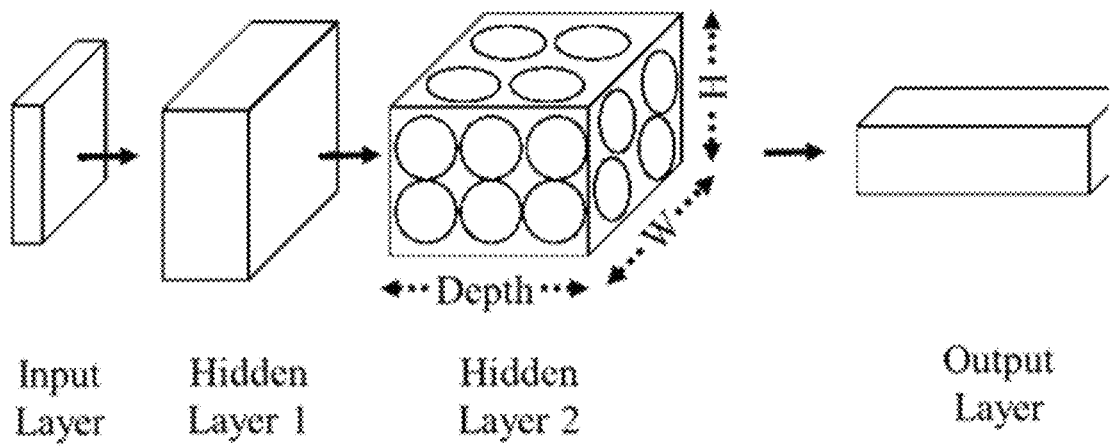
FIG. 5B illustrates an example of CNN in which the dimension of the second hidden layer is [W, H, Depth] in accordance with some implementations of the present disclosure.

FIG. 5A illustrates an FC-NN with two hidden layers in accordance with some implementations of the present disclosure. CNN, a popular neural network architecture for image or video applications, is very similar to the FC-NN as shown in FIG. 5A, which includes weights and bias metrices. A CNN can be seen as a 3-D version of neural network. FIG. 5B illustrates an example of CNN in which the dimension of the second hidden layer is [W, H, Depth] in accordance with some implementations of the present disclosure. In FIG. 5B, neurons are arranged in 3-Dimensional structure (width, height, and depth) to form a CNN, and the second hidden layer is visualized. In this example, the input layer holds input image or video frames therefore its width and height are same as input data. To apply with image or video applications, each neuron in CNN is a spatial filter element with extended depth aligned with its input, e.g., the depth is 3 if there are 3 color components in input images.

Figure 6:
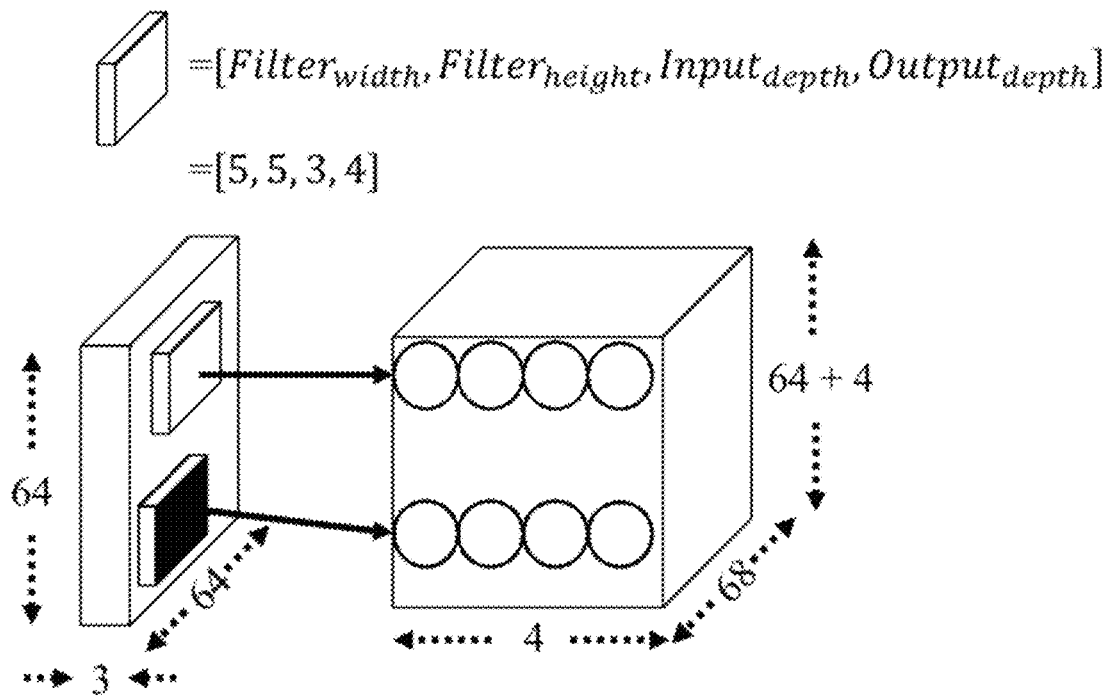
FIG. 6 illustrates an example of applying spatial filters with an input image in accordance with some implementations of the present disclosure.

FIG. 6 illustrates an example of applying spatial filters with an input image in accordance with some implementations of the present disclosure. As shown in FIG. 6, the dimension of basic element in CNN is defined as [$Filter_{width}$, $Filter_{height}$, $Input_{depth}$, $Output_{depth}$] and set to [5, 5, 3, 4] in this example. Each spatial filter performs 2-dimensional spatial convolution with 5*5*3 weights on an input image. The input image may be a 64×64×3 image. Then, 4 convolutional results are outputted. Therefore, the dimension of filtered results is [64+4, 64+4, 4] if padding the boundary with additional 2 pixels.

Residual Network (ResNet)

In image classification, the accuracy is saturated and degrades rapidly when the depth of neural network increases. To be more specifically, adding more layers on deep neural network results in higher training error because the gradient is gradually vanishing along the deep network and toward to zero gradient at the end. Then, the ResNet composed of residual blocks comes to resolve the degradation problem by introducing the identity connection.

Figure 7A:
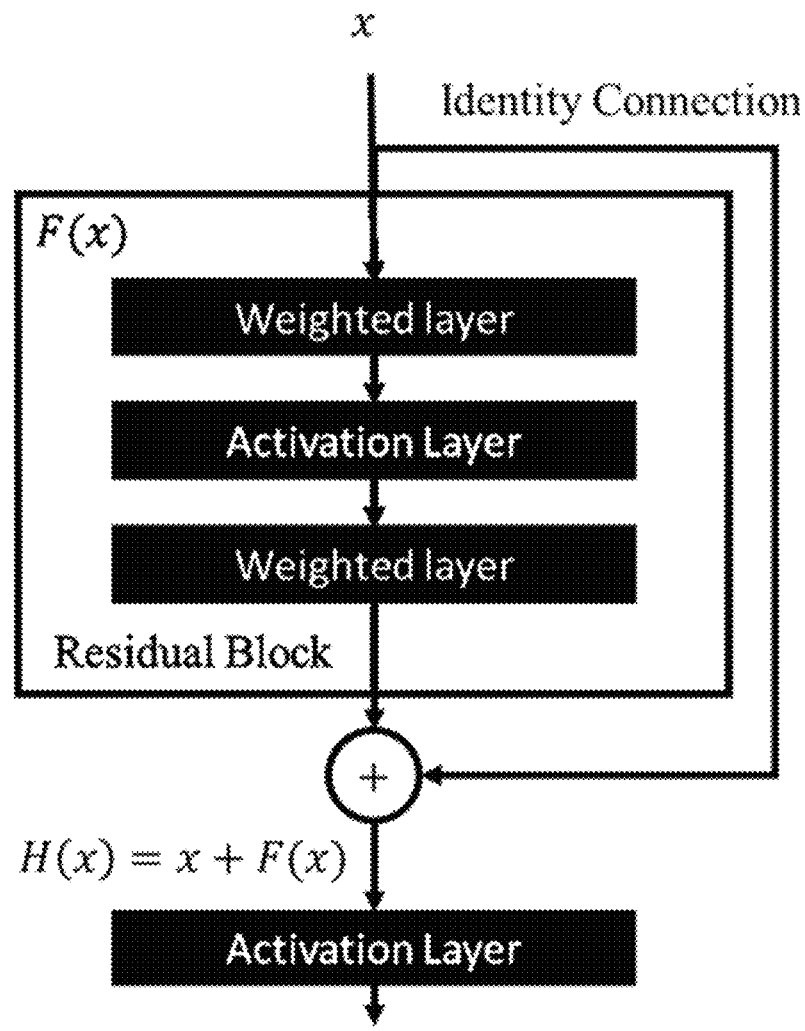
FIG. 7A illustrates a Residual Network (ResNet) including a residual block as the element of ResNet that is elementwise added with its input by identity connection in accordance with some implementations of the present disclosure.

FIG. 7A illustrates a ResNet including a residual block as the element of ResNet that is elementwise added with its input by identity connection in accordance with some implementations of the present disclosure. As shown in FIG. 7A, a basic module of ResNet is consist of the residual block and the identity connection. According to the universal approximation hypothesizes, given an input x, weighted layers with activation function in residual block approximate a hidden function F(x) rather than the output H(x)=F(x)+x.

By stacking non-linear multi-layer neural network, the residual block explores the features that represent the local characteristic of input images. Without introducing neither additional parameters and computational complexity, the identity connection is proven to make deep learning network trainable by skip one or more non-linear weighted layers as shown in FIG. 7A. Skipping weighted layers, the differential output of the residual layers can be written as $$\frac{\partial H(x)}{\partial x} = \frac{\partial F(x)}{\partial x} + 1 \quad (5)$$

Figure 7B:
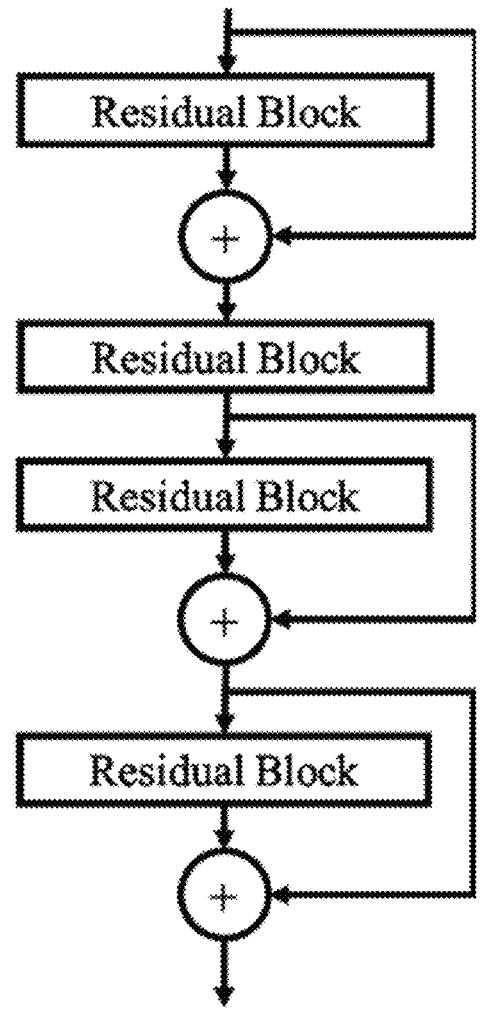
FIG. 7B illustrates an example of ResNet by staking residual blocks in accordance with some implementations of the present disclosure.

Therefore, even if the differential term $$\frac{\partial F(x)}{\partial x}$$

is gradually decreasing toward zero, the identity term can still carry on and pass the input to next layer instead of stuck at zero gradient as well as blocking information propagation. If a neuron cannot propagate information to next neuron, it is seen as dead neuron, which is non-trainable element in neural network. After addition, another non-linear activation function can be applied as well. FIG. 7B illustrates an example of ResNet by staking residual blocks in accordance with some implementations of the present disclosure. As shown in FIG. 7B, the residual features are fused with the identity features before propagating to the next module.

Variations of ResNet

Figure 8A:
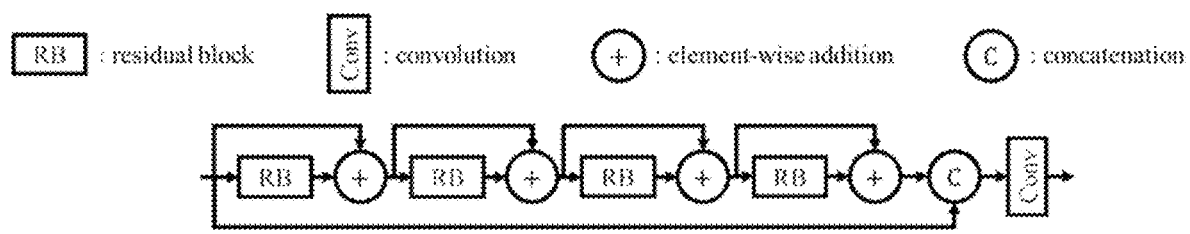
FIG. 8A illustrates an example of ResNet including a plurality of residual blocks with global identity connection in accordance with some implementations in the present disclosure.

In FIGS. 8A-8B, several variations of ResNet were proposed to improve the recovered image quality for single image super-resolution (SISR) and increase the accuracy for image classification. FIG. 8A illustrates an example of ResNet including a plurality of residual blocks with global identity connection in accordance with some implementations in the present disclosure. In FIG. 8A, a variation of ResNet is proposed to enhance the visual quality of the up-sampled images. Specifically, a global identity connection is applied from the input of first residual block to the output of last residual block in order to facilitate the convergence of training procedure.

FIG. 8B illustrates another example of ResNet stacks multiple residual blocks in order to further improve the video coding efficiency in accordance with some implementations in the present disclosure. Each residual block directly propagates its own input to the following unit by concatenation operation. In other words, each intermediate block can receive multi-hierarchical information from its preceding units because multi-level information can flow through the identical connection. The parameter of each residual block in FIG. 8B is linearly increased with the number of layers because the concatenation operation.

In FIGS. 8A-8B, before the residual information can be propagated to later module, the residual features have to go through one or several modules. Due to identity connection, these residual features can be rapidly coupled with identity features at certain layer and stop propagating to succeeding module. Therefore, the residual features in previous two variations are limited locally and results in performance degradation.

FIG. 8C illustrates another example of ResNet tackling single-image super-resolution (SISR) by aggregating the output of residual blocks in accordance with some implementations in the present disclosure. In FIG. 8C, the output of the last residual block is concatenated with all the output of previous three modules. Before applied with element-wise addition with the input of first residual block, the concatenated hierarchical features are fused by convolutional operation. Different from the first two variations, aggregated ResNet make non-local features applicable to the last residual block so that the hierarchical information can be propagated to succeeding blocks, achieving the feature representation in a more discriminative way.

In the present disclosure, methods and apparatus related to neural network based image filtering are proposed to further improve the coding efficiency of current hybrid video coding. The proposed methods and apparatus may be applied as part of the in-loop filtering, e.g., between the deblocking filter and sample adaptive offset (SAO) as shown in FIG. 2 or as post-loop filtering to improve the current video coding techniques, or as post-processing filtering after the current video coding techniques.

FIG. 9 illustrates a typical neural network based model to perform image filtering for video coding in accordance with some implementations in the present disclosure. The YUV components may be provided to the neural network model in parallel. This paralleled input of YUV components may be beneficial not only for reducing processing delay but also for the neural network model to learn the correlations among collocated YUV information, e.g., cross-components filtering and/or luma guided chroma filtering. The on/off control of this neural network model based filter may be performed at CTU level for reasonable tradeoff between control granularity and signaling overhead.

Feature Map Resolution Alignment

When the CTU level YUV information is provided to the neural network model filter as shown in FIG. 9, the resolutions of the YUV CTU patches may or may not be the same. For example, if the encoded video content is YUV420, the resolutions of the three collocated YUV patches may not be the same. In this case, resolution alignment is needed. For easier illustration purpose, all the proposed methods and devices in this disclosure are assuming the video content is YUV420. For different content format, e.g., YUV422, YUV444, the proposed methods may be easily extended.

In some examples, the resolution alignment may be performed before the YUV patches enter the neural network.

In some examples, one 128×128 Y patch may be downsampled into one 64×64 patch or four 64×64 patches. When four 64×64 patches are generated, all the information of the original 128×128 patch may be kept and distributed in the four 64×64 patches. The method used for the information distribution of the original 128×128 patch may be partition based, e.g., one 64×64 patch may be from the top-left of the original 128×128 patch, and another 64×64 patch may be from the top-right of the original 128×128 patch. Alternatively, the method used for the information distribution of the original 128×128 patch may be interleave based, e.g., every four adjacent samples of the original 128×128 patch are evenly distributed in the four 64×64 patches.

In some examples, one 64×64 U or V patch may be up-sampled into one 128×128 patch.

In some examples, the resolution alignment may be performed after the YUV patches enter the neural network. In one example, the Y input resolution may be decreased to match the UV input. One way to achieve this is to use convolution layers with doubled stride size compared to UV input. In this example, at the end of the neural network, a resolution increase layer is needed to scale up the Y content such that the output of the model has the same resolution as the input. One way to achieve this is to use pixel shuffle layer to scale up the Y resolution. In another example, the UV input resolution may be increased to match the Y input. One way to achieve is to use pixel shuffle layer to scale up UV at the beginning of the neural network, and then scale down at the end of the neural network.

Feature Map Resolution Control

Feature map resolution proportionally affects the neural network processing overhead, but may not be proportionally affect the performance of the neural network. In order to control the computation complexity of the model filtering, different solutions may be available, e.g., number of residual blocks, number of input and output channels of the convolution layers at each residual block. Resolution control of the feature map in a convolution layer is another effective option to control the computation complexity.

Figure 10:
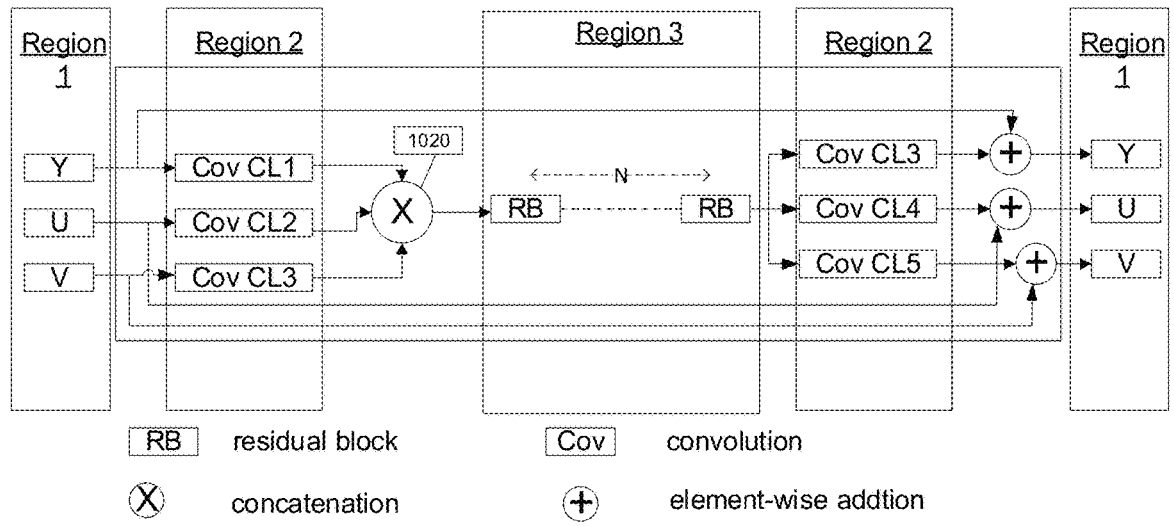
FIG. 10 illustrates three regions to adjust feature map resolution for computation complexity control in accordance with some implementations in the present disclosure.

FIG. 10 illustrates three regions to adjust feature map resolution for computation complexity control in accordance with some implementations in the present disclosure. As shown in FIG. 10, in the region 1, resolution of the input YUV patches is determined and corresponding scale up/down operations are performed. For example, the up/down sampling methods introduced in "Feature map resolution alignment."

In region 2, resolution of the input YUV patches is determined and corresponding scale up/down operations are performed before YUV concatenation. As this region is located at the beginning of the neural network, if scale down operations are performed, input information may be lost significantly and overall performance after model training may be compromised.

In the region 3, resolution of the input YUV patches may be scaled up/down at one of the earlier residual blocks, and inverse operations, e.g., scale down/up, may be performed at later residual blocks. As this region is located after YUV concatenation, if scale down operation is performed, input information may be less significantly lost than region 2 since most input information are already captured or learned in earlier convolution layers which have enough depth for information learning. For example, after region 2, three channels of YUV content which has UV scaled up to 128×128 are generated. Y input information may be already learned/extracted and distributed/duplicated in earlier convolutional layers before the concatenation. Alternatively, a scale down operation may be performed after the first residual block because the first residual block may have enough channels to learn/extract Y input information features.

QP Independent Neural Network Model

Figure 11:
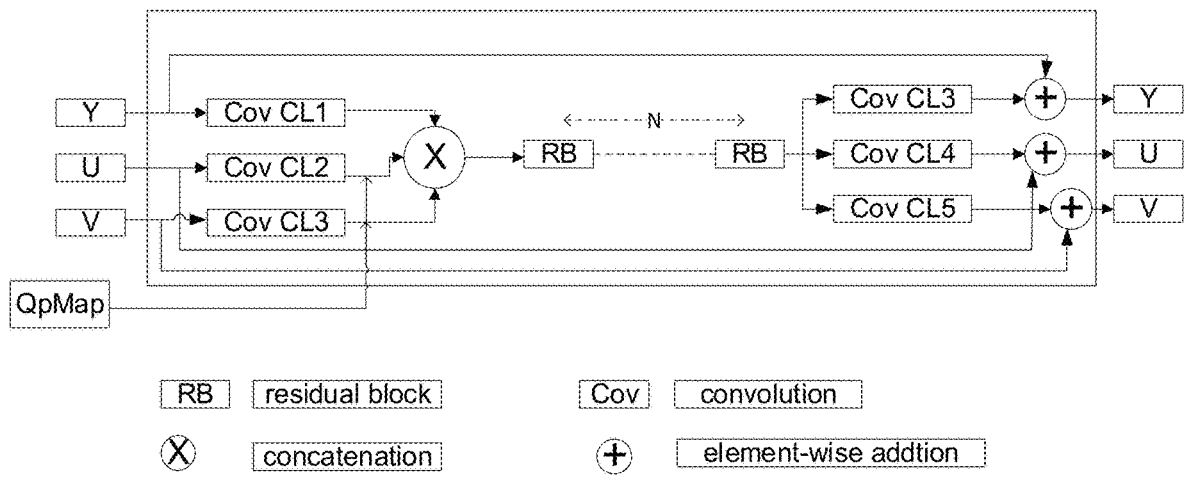
FIG. 11 illustrates a typical QP-independent neural network model in accordance with some implementations of the present disclosure.

In order to facilitate easier deployment of the proposed neural network model filtering, it is desired to remove input quantization parameter (QP) dependency from the neural network model. Thus, a single neural network model may be used for image filtering regardless of the input QP used for the video coding FIG. 11 illustrates a typical QP-independent neural network model in accordance with some implementations of the present disclosure. For a typical video coding system, a QP value is used to calculate quantization step size for prediction residual quantization/de-quantization. Therefore, a different QP value represents a different level of video quality. In order to handle different video frames with different input QP and quality, a QpMap is provided to the neural network. The QpMap adds another dimension of information for neural network to learn and adaptively filter the provided YUV input.

Dynamic Range Control of QpMap Values

FIG. 11 illustrates a typical QP-independent neural network based model to perform image filtering for video coding in accordance with some implementations of the present disclosure. The QpMap are concatenated with YUV input channels. Each QpMap channel may contain the same value at different coordinates. And each QpMap channel may have the same resolution as the associated input channel. This is to say, QpMap channel for Y input has the same resolution as the Y input channel and each value of the QpMap indicates that all the samples within the Y input channel have the same Qp values.

Input QP value of each video frame/image may be directly used to generate QpMap value. Alternatively, input QP value of each video frame/image may be converted into Qp step size first, e.g., $Q_{step}=2^{(QP-4)/6}$, to generate QpMap value.

When QpMap values are generated from input QP or Qp step size, the QpMap value dynamic range is desired to be reasonable in following three senses.

First, the range should be large enough, so that different QpMap values can be easily used to represent/differentiate different input Qp or Qp step size. In other words, given two input Qp value, the corresponding QpMap values should not be close to each other.

Second, the range should be balanced enough, so that different QpMap values can evenly distributed at different positions of the range.

Third, the range should match the dynamic range of the associated YUV sample values. For example, if YUV sample values are normalized to [0, 1] by dividing the $P_{max}$, where $P_{max}=2^{bitdepth}-1$, the QpMap value is supposed to be normalized in a similar range as well.

Therefore, when QpMap is mapped to a dynamic range, it is proposed to not use the maximum or minimum input Qp or Qp step size as the dividing factor, otherwise the division will push the generated QpMap value towards one side of the dynamic range, which is equal to reduce the dynamic range of the QpMap value.

For example, if using maximal QpStep size 912 (corresponding to maximal input Qp 63), the theoretic dynamic range is (0, 1), but if input Qp step size is typically less than 45 (corresponding to input Qp 37), the effective dynamic range is only (0, 0.05), which means that in most cases QpMap value is close to 0.

Instead, it is proposed to use middle/median input Qp or Qp step size to do the normalization, so that the generated QpMap value may be distributed at either side of the dynamic range. e.g. [0.5, 1.5]. One exemplary selected middle/median input Qp value is Qp 32, and then converted into Qp step size is approximately 25.5, according to a QP-to-Qstep (Qp step size) equation (e.g., $Q_{step}=2^{(Q-4)/6}$). Thus, any input Qp value is first converted to a corresponding Qp step size and then followed by a division by the selected Qp Step size 25.5.

Prediction Based Adjustment of QpMap Values

For inter-predicted video frames/images, most blocks/CTUs in the frame/image may be inter-predicted with small or no residuals, e.g., skip mode. In this case, the effective input Qp value should be determined by the corresponding reference frames/images.

In some examples, the input Qp value of the corresponding reference frame/image may be saved and obtained when the current image is reconstructed during motion compensation process. The input QP value of each current frame is known. But the input Qp value of this frame becomes unknown when this frame is not current and this frame is a reference frame for another frame. Thus, Qp values have to be saved in order to obtain it in the future.

In some embodiments, the input Qp value of the corresponding reference frame/image may be derived by subtracting a specific value from the QP value of the current frame which is inter-coded, where the specific value may be obtained by checking the temporal layer index of the current frame which is inter-coded.

In some other embodiments, if the reference frame/image is a chain of reference images (the reference frame/image of a reference frame/image), this information may be inherited or carried over from signaling.

In a simple solution, for an inter-predicted video frame/image, the effective Qp step size may be derived by a constant scaling factor such as 0.5 from the Qp step size of the current frame, which corresponds to an input Qp difference with value 6. This scaling operation is an approximation to the reference frame/image input Qp or Qp step size.

In one or more embodiments, the scaling of Qp Step size may be applied to an intra-predicted frame/image as well, to compensate the inaccuracy of the constant scaling factor used for subsequent inter-predicted frames.

QpMap Value Based Sample Value Scaling

A QP-independent neural network model may not explicitly contain QpMap channels in the network. For example, as shown in FIG. 11, the QpMap value generated for each YUV channel is concatenated with YUV channels. Alternatively, the QpMap value fed into the network may be used to directly scale the sample values in each YUV channel. In this way, QpMap channels are not concatenated with YUV channels, which represents an implicit use of QpMap in the network.

In some examples of the implicit use of QpMap, the QpMap data may not be fed into the network, the scaling of sample values in each YUV channel is performed before the neural network.

Interactions Between Neural Network Based Model Filtering and Other In-Loop Filters When neural network based model filtering is signaled to be turned on at CTU level or frame level, the deblocking filtering may be skipped to avoid unnecessary computation or over-smoothing. Alternatively, the deblocking filtering may be still performed for visual quality purpose.

When neural network based model filtering is signaled to be turned on at CTU level or frame level, some other in-loop filters such ALF, CCALF and SAO may be turned off.

When neural network based model filtering is signaled to be turned on at CTU level or frame level, other in-loop filters may be selectively turned on or off at CTU level or frame level. For example, if an intra-frame or an intra-frame CTU is enabled for neural network based model filtering, other in-loop filters such as deblocking filtering, or/and ALF, or/and CCALF, or/and SAO, for current intra-frame, or current intra-frame CTU are disabled.

Figure 12:
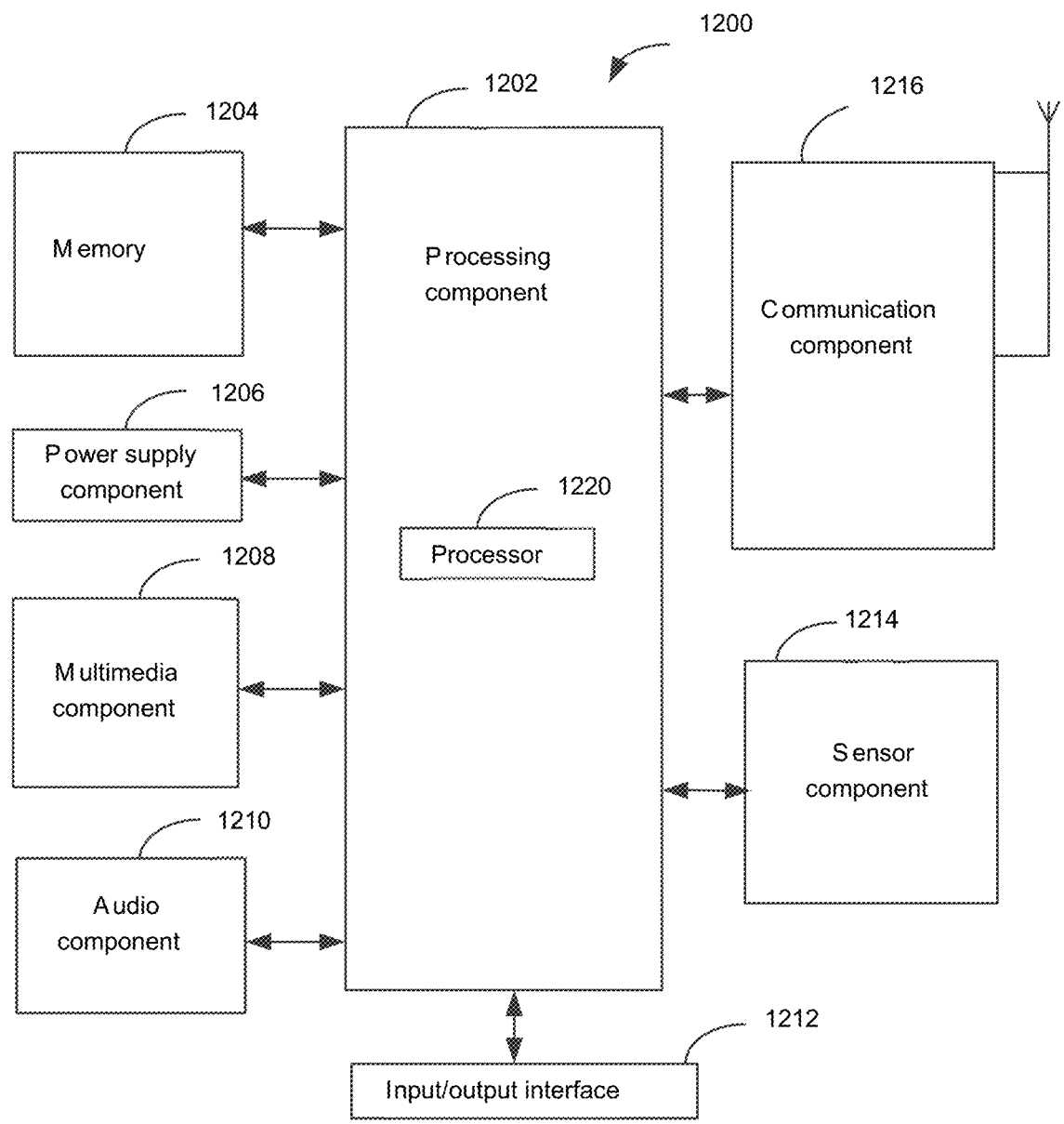
FIG. 12 is a block diagram illustrating an apparatus for image filtering in video coding using a neural network in accordance with some implementations of the present disclosure.
Figure 15:
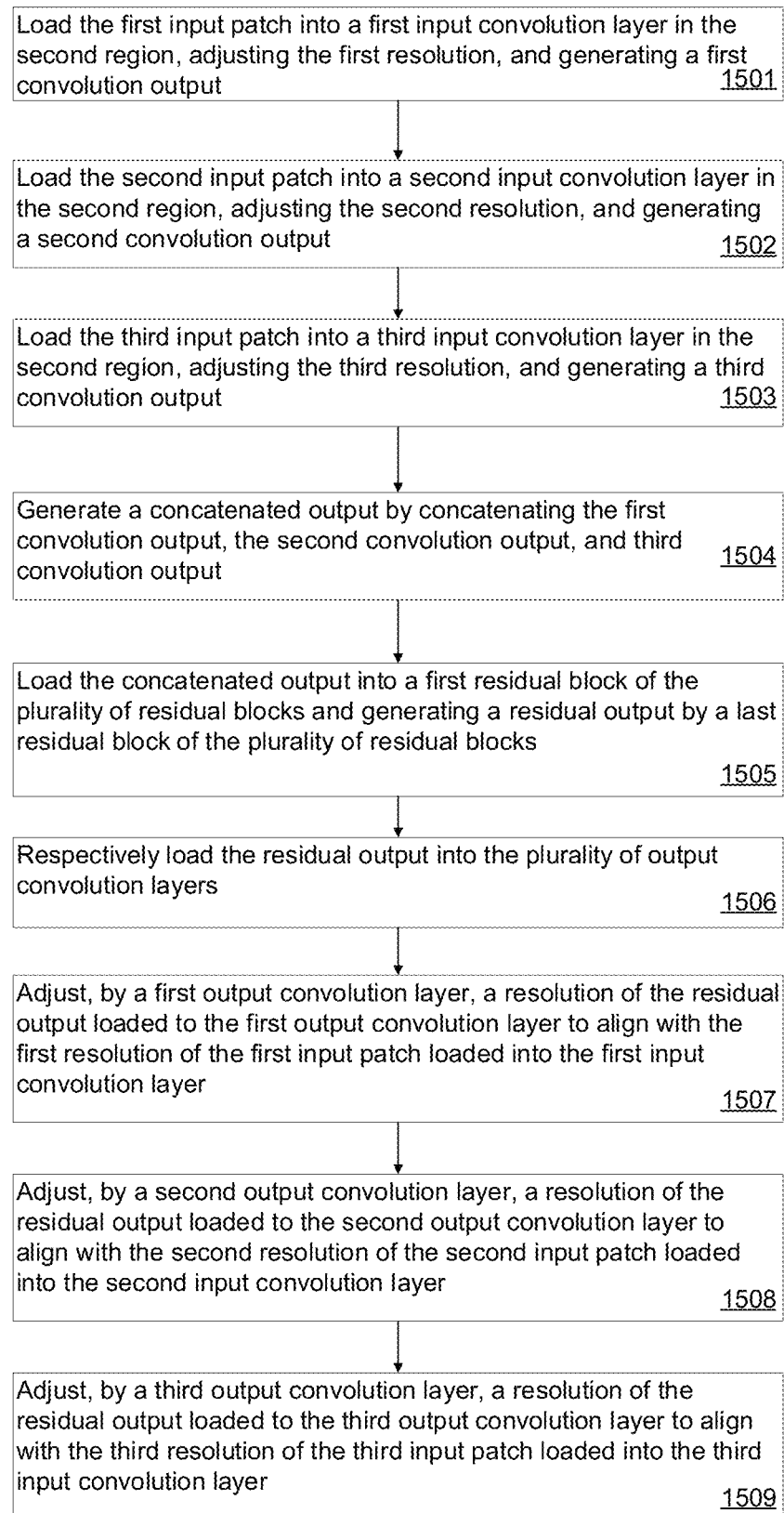
FIG. 15 is a flowchart illustrating an example process for image filtering in video coding using a neural network in accordance with the present disclosure.
Figure 16:
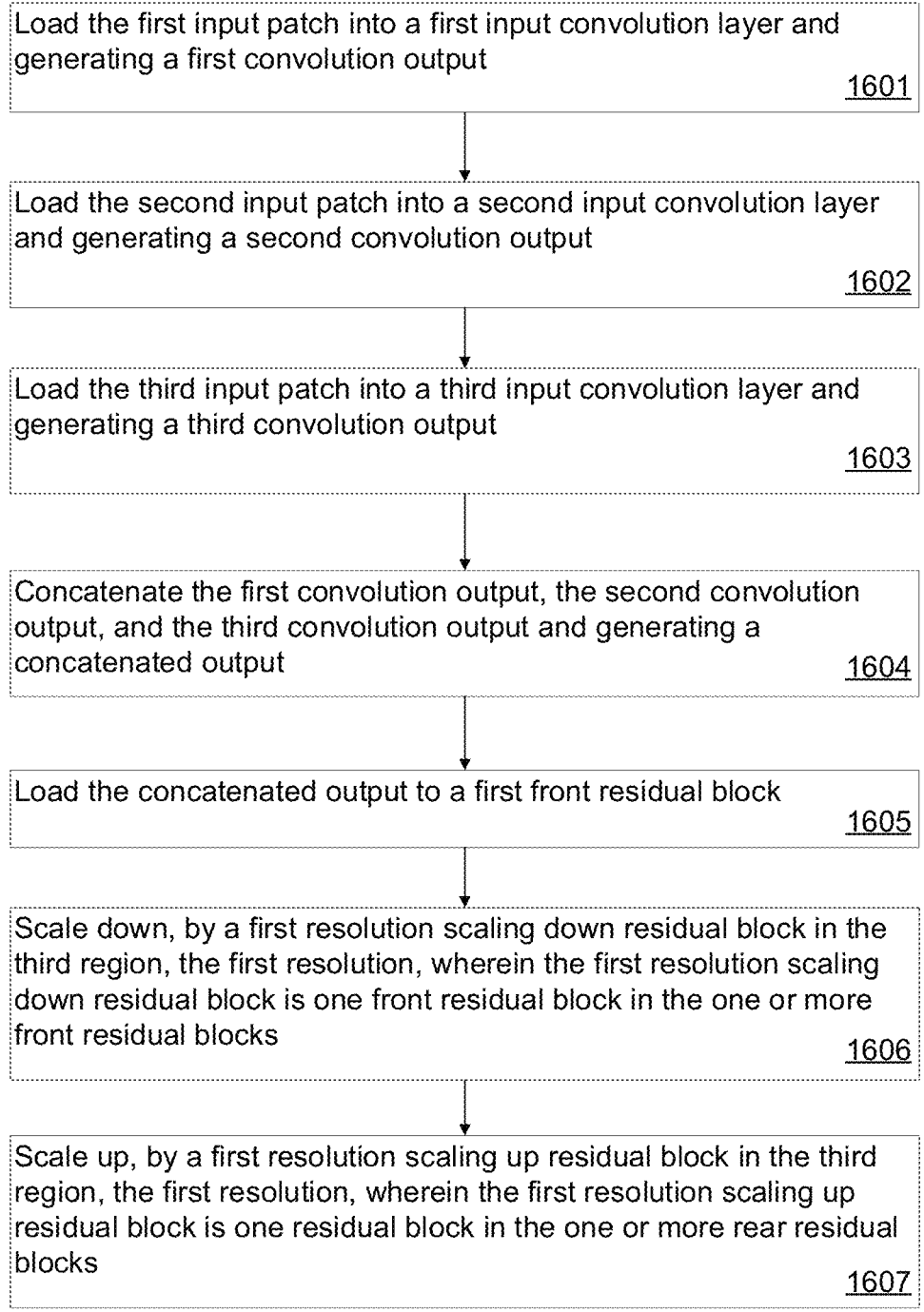
FIG. 16 is a flowchart illustrating an example process for image filtering in video coding using a neural network in accordance with the present disclosure.

FIG. 12 is a block diagram illustrating an apparatus for image filtering in video coding using a neural network in accordance with some implementations of the present disclosure. The apparatus 1200 may be a terminal, such as a mobile phone, a tablet computer, a digital broadcast terminal, a tablet device, or a personal digital assistant.

As shown in FIG. 12, the apparatus 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 usually controls overall operations of the apparatus 1200, such as operations relating to display, a telephone call, data communication, a camera operation, and a recording operation. The processing component 1202 may include one or more processors 1220 for executing instructions to complete all or a part of steps of the above method. Further, the processing component 1202 may include one or more modules to facilitate interaction between the processing component 1202 and other components. For example, the processing component 1202 may include a multimedia module to facilitate the interaction between the multimedia component 1208 and the processing component 1202.

The memory 1204 is configured to store different types of data to support operations of the apparatus 1200. Examples of such data include instructions, contact data, phonebook data, messages, pictures, videos, and so on for any application or method that operates on the apparatus 1200. The memory 1204 may be implemented by any type of volatile or non-volatile storage devices or a combination thereof, and the memory 1204 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1206 supplies power for different components of the apparatus 1200. The power supply component 1206 may include a power supply management system, one or more power supplies, and other components associated with generating, managing and distributing power for the apparatus 1200.

The multimedia component 1208 includes a screen providing an output interface between the apparatus 1200 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1208 may include a front camera and/or a rear camera. When the apparatus 1200 is in an operation mode, such as a shooting mode or a video mode, the front camera and/or the rear camera may receive external multimedia data.

The audio component 1210 is configured to output and/or input an audio signal. For example, the audio component 1210 includes a microphone (MIC). When the apparatus 1200 is in an operating mode, such as a call mode, a recording mode and a voice recognition mode, the microphone is configured to receive an external audio signal. The received audio signal may be further stored in the memory 1204 or sent via the communication component 1216. In some examples, the audio component 1210 further includes a speaker for outputting an audio signal.

The I/O interface 1212 provides an interface between the processing component 1202 and a peripheral interface module. The above peripheral interface module may be a keyboard, a click wheel, a button, or the like. These buttons may include but not limited to, a home button, a volume button, a start button, and a lock button.

The sensor component 1214 includes one or more sensors for providing a state assessment in different aspects for the apparatus 1200. For example, the sensor component 1214 may detect an on/off state of the apparatus 1200 and relative locations of components. For example, the components are a display and a keypad of the apparatus 1200. The sensor component 1214 may also detect a position change of the apparatus 1200 or a component of the apparatus 1200, presence or absence of a contact of a user on the apparatus 1200, an orientation or acceleration/deceleration of the apparatus 1200, and a temperature change of apparatus 1200. The sensor component 1214 may include a proximity sensor configured to detect presence of a nearby object without any physical touch. The sensor component 1214 may further include an optical sensor, such as a CMOS or CCD image sensor used in an imaging application. In some examples, the sensor component 1214 may further include an acceleration sensor, a gyroscope sensor, a magnetic sensor, a pressure sensor, or a temperature sensor.

The communication component 1216 is configured to facilitate wired or wireless communication between the apparatus 1200 and other devices. The apparatus 1200 may access a wireless network based on a communication standard, such as WiFi, 4G, or a combination thereof. In an example, the communication component 1216 receives a broadcast signal or broadcast related information from an external broadcast management system via a broadcast channel. In an example, the communication component 1216 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1200 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors, or other electronic elements to perform the above method. A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

FIG. 13 is a flowchart illustrating a process for image filtering in video coding using a neural network in accordance with some implementations of the present disclosure.

In step 1301, the processor 1220 loads a plurality of input patches associated with a current image to be coded, where the plurality of input patches include a first input patch with a first resolution, a second input patch with a second resolution, and a third input patch with a third resolution.

In some examples, the first input patch may be the Y patch that is inputted to the neural network in region 1 as shown in FIGS. 10-11. The second input patch may be the U patch that is inputted to the neural network in region 1 as shown in FIGS. 10-11. The third input patch may be the V patch that is inputted to the neural network in region 1 as shown in FIGS. 10-11.

In step 1302, the processor 1220 adjusts the first resolution, the second resolution, and the third resolution at one region of a plurality of regions before or in the neural network.

In some examples, the plurality of regions include a first region, a second region, and a third region. For example, the first region may be the region 1, the second region may be the region 2, and the third region may be the region 3, as shown in FIG. 10.

In some examples, the first region may include a plurality of input layers receiving the plurality of input patches and a plurality of output layers outputting a plurality of output patches. For examples, as shown in FIG. 10, the first region may include layers located before the neural network and layers located after the neural network. In some examples, the plurality of input layers are before a plurality of convolution layers that receive inputs of the neural network. The plurality of output layers are after a plurality of convolution layers that after elementwise addition layers in the neural network as shown in FIG. 10.

In some examples, the second region may include a plurality of input convolution layers and a plurality of output convolution layers, and the plurality of input convolution layers subsequently follow the plurality of input layers and perform convolution on the plurality of input patches. In some examples, the third region may include a plurality of residual blocks, and the plurality of output convolution layers subsequently follow the plurality of residual blocks.

In some examples, the processor 1220 may aligning the first resolution, the second resolution, and the third resolution using the plurality of input layers in the first region in response to determining that one resolution in the first, second, and third resolutions is different from the other two resolutions.

In some examples, as stated in step 1402, the processor 1220 may down-sample the first input patch into a plurality of first input sub-patches having same resolution as the second or third patch using the plurality of input layers in the first region. For example, the plurality of first input sub-patches may be the four 64×64 Y patches that are down-sampled from one 128×128 Y patch.

In some examples, as stated in step 1403, the processor 1220 may combine the plurality of first input sub-patches with the second and third input patches. Further, as in step 1404, the processor 1220 may generate a plurality of output patches corresponding to the plurality of input patches, where the plurality of output patches include a plurality of first output sub-patches, a second output patch, and a third output patch, and up-sample the plurality of first output sub-patches using the plurality of output layers in the first region.

In some examples, as stated in step 1405, the processor 1220 may up-sample the second output patch or the third output patch using the plurality of input layers in the first region and down-sample the second output patch or the third output patch using the plurality of output layers in the first region.

In some examples, the processor 1220 may load the first input patch into a first input convolution layer in the second region and adjust, by the first input convolution layer, the first resolution to align with the second or third resolution. For example, the first input convolution layer may be the convolution layer CL1 that receives the Y patch.

In some examples, the processor 1220 may load the second input patch into a second input convolution layer in the second region and adjust, by the second input convolution layer, the second resolution to align with the first or third resolution. For example, the second input convolution layer may be the convolution layer CL2 that receives the U patch.

In some examples, the processor 1220 may load the third input patch into a third input convolution layer in the second region and adjust, by the third input convolution layer, the third resolution to align with the first or second resolution. For example, the third input convolution layer may be the convolution layer CL3 that receives the V patch.

In some examples, the first input convolution layer with a stride size greater than a second input convolution layer or a third input convolution layer may scale down the first resolution to align with the second or third resolution.

In some examples, a pixel shuffle layer in the second region may scale up the second resolution to align with the first or third resolution.

In some examples, a pixel shuffle layer in the second region may scale up the third resolution to align with the first or second resolution.

In some examples, a pixel shuffle layer in the second region may scale up a resolution of a first output patch corresponding to the first input patch such that the first output patch has the same resolution as the first input patch.

In some examples, a resolution increase layer in the second region may scale down a resolution of a second output patch corresponding to the second input patch such that the second output patch has the same resolution as the second input patch.

In some examples, a resolution increase layer in the second region may scale down a resolution of a third output patch corresponding to the third input patch such that the third output patch has the same resolution as the third input patch.

In some examples, the processor 1220 may: in step 1501, load the first input patch into a first input convolution layer in the second region, adjust the first resolution, and generating a first convolution output; in step 1502, load the second input patch into a second input convolution layer in the second region, adjust the second resolution, generate a second convolution output; in step 1503, load the third input patch into a third input convolution layer in the second region, adjust the third resolution, and generate a third convolution output; in step 1504, generate a concatenated output by concatenating the first convolution output, the second convolution output, and third convolution output; in step 1505, load the concatenated output into a first residual block of the plurality of residual blocks and generating a residual output by a last residual block of the plurality of residual blocks; in step 1506, respectively load the residual output into the plurality of output convolution layers; in step 1507, adjust a resolution of the residual output loaded to the first output convolution layer to align with the first resolution of the first input patch loaded into the first input convolution layer by a first output convolution layer; in step 1508, adjust a resolution of the residual output loaded to the second output convolution layer to align with the second resolution of the second input patch loaded into the second input convolution layer by a second output convolution layer; and in step 1509, adjust a resolution of the residual output loaded to the third output convolution layer to align with the third resolution of the third input patch loaded into the third input convolution layer by a third output convolution layer. For example, the first, second and third output convolution layers are respectively convolution layers CL4, CL5, and CL6 in FIG. 10.

In some examples, the neural network may further include a concatenating layer 1020. Further, the plurality of residual blocks may include one or more front residual blocks, one or more intermediate residual blocks, and one or more rear residual blocks, the one or more front residual blocks are followed by the one or more intermediate residual blocks that are followed by the one or more rear residual blocks.

In some examples, the processor 1220 may: in step 1601, load the first input patch into a first input convolution layer and generate a first convolution output; in step 1602, load the second input patch into a second input convolution layer and generating a second convolution output; in step 1603, load the third input patch into a third input convolution layer and generate a third convolution output; in step 1604, concatenate the first convolution output, the second convolution output, and the third convolution output and generate a concatenated output; and in step 1605, load the concatenated output to a first front residual block. Further, in step 1606, a first resolution scaling down residual block in the third region may scale down the first resolution, where the first resolution scaling down residual block is one front residual block in the one or more front residual blocks. After the scaling down, in step 1607, a first resolution scaling up residual block in the third region may scale up the first resolution, where the first resolution scaling up residual block is one rear residual block in the one or more rear residual blocks. The first resolution scaling down residual block may be the first or the second or any one of the subsequent front residual blocks. In some examples, the first resolution scaling down residual block may or may not follow the first front residual block.

In some examples, a second resolution scaling down residual block in the third region may scale down the second resolution or the third resolution, where the second resolution scaling down residual block is one front residual block in the one or more front residual blocks. After the scaling down, a second resolution scaling up residual block in the third region may scale up the second resolution or the third resolution, where the second resolution scaling up residual block is one rear residual block in the one or more rear residual blocks.

In the present disclosure, performing scaling down/up operations in different regions is to align resolutions among YUV if YUV resolutions are different and to reduce complexity or improve performance. In some examples, when YUV resolutions are different, aligning resolutions among YUV should be performed in regions 1 or 2 as shown in FIG. 10. To align resolutions among YUV, UV resolutions may be increased to align with Y or Y resolution may be reduced to align with UV. To reduce complexity, scaling down may be performed first and the inversed scaling up may be then performed in regions 1, 2 or 3.

In some examples, the processor 1220 may load a plurality of QpMap values at a plurality of QpMap channels, where the plurality of QpMap values may include a first QpMap value at a first QpMap channel, a second QpMap value at a second QpMap channel, and a third QpMap value at a third QpMap channel. Further, the processor 1220 may adjust the first, second, and third QpMap values so that the first, second, and third QpMap values are within a dynamic range.

For example, QpMap may have three channels for YUV respectively: QP-Y, QP-U, QP-V because YUV may have different QP values.

In some examples, the first, second, and third QpMap values are evenly distributed at different positions of the dynamic range.

In some examples, the first, second, and third QpMap values are normalized by a dividing factor into the dynamic range that matches a QP value range associated with the first, second, and third input patches, and the QP value range is obtained by normalizing input QP values of the first, second and third input patches by the dividing factor.

In some examples, the input QP values are saved and obtained upon reconstruction of the current image during motion compensation.

In some examples, the input QP values are obtained by subtracting a first value from the input QP values of the current image that is inter-coded, where the first value is determined based on a temporal layer index of the current image that is inter-coded.

In some examples, the input QP values are obtained through reference signaling.

In some examples, the plurality of map values are determined according to input QP values of the current image or QP step sizes corresponding to the input QP values. Further, the processor 1220 may scale the QP step sizes using a constant scaling factor.

In some examples, the processor 1220 may generate, according to QP values of input channels of the current image, a plurality of QpMap values at a plurality of QpMap channels respectively corresponding to the input channels, and scale the plurality of input patches at the input channels by respectively concatenating the plurality of QpMap channels with the input channels.

QpMap may be explicitly generated by using Qp values of YUV channels. In this case, QpMap channels are concatenated with YUV channels. For example, if there are 3 YUV channel, then there will be three QpMap channels for YUV respectively, and there will be 6 channels after concatenation.

In some examples, QpMap may not be generated. The equivalent QpMap values of YUV channels may be directly used to scale the YUV channels at each sample location. In this case, each sample of YUV channels already contains the Qp information. After concatenation, there are only 3 channels. When QpMap is not generated, the sample values of YUV are directly scaled by equivalent QpMap values. There are two places to scale: scale inside the network and scale outside of the network. If scale is performed outside of the network, the Qp values, which is called as QpMap data, are not feed into the network.

In some examples, the processor 1220 may scale, based on scaling factors, the plurality of input patches respectively at the input channels before loading the plurality of input patches to the neural network. In some examples, the processor 1220 may scale, based on scaling factors, the plurality of input patches respectively at the input channels after loading the plurality of input patches to the neural network. In some examples, the processor 1220 may skip deblocking filtering in the video coding in response to determining that the image filtering in the video coding using the neural network is signaled to be turned on at a CTU level or a frame level.

In some examples, the processor 1220 may turn off in-loop filters in the video coding in response to determining that the image filtering in the video coding using the neural network is signaled to be turned on at a CTU level or a frame level. In some examples, the processor 1220 may selectively turn off in-loop filters in the video coding in response to determining that the image filtering in the video coding using the neural network is signaled to be turned on at a CTU level or a frame level.

In some other examples, there is provided a non-transitory computer readable storage medium 1204, having instructions stored therein. When the instructions are executed by one or more processors 1220, the instructions cause the processor to perform any method as described in FIG. 13 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for image filtering in video coding, comprising:
  loading a plurality of input patches associated with a current image to be coded, wherein the plurality of input patches comprise a first input patch with a first resolution, a second input patch with a second resolution, and a third input patch with a third resolution; and
  in response to determining that one resolution in the first resolution, the second resolution, and the third resolution is different from the other two resolutions, adjusting the first resolution, the second resolution, and the third resolution at one region of a plurality of regions;
  wherein the one region of a plurality of regions comprises a first region; the first region comprises a plurality of input layers receiving the plurality of input patches before a neural network for image filtering and a plurality of output layers outputting a plurality of output patches after the neural network;
  wherein the method further comprising:
  loading a plurality of quantization parameter (QP) map (QpMap) values at a plurality of QpMap channels, wherein the plurality of QpMap values comprise a first QpMap value at a first QpMap channel, a second QpMap value at a second QpMap channel, and a third QpMap value at a third QpMap channel; and
  adjusting the first QpMap value, the second QpMap value, and the third QpMap value so that the first QpMap value, the second QpMap value, and the third QpMap value are within a dynamic range;
  wherein the first QpMap value, the second QpMap value, and the third QpMap value are evenly distributed at different positions of the dynamic range.

2. The method of claim 1, wherein the plurality of regions further comprise a second region in the neural network, and a third region;
  wherein the second region comprises a plurality of input convolution layers and a plurality of output convolution layers, and the plurality of input convolution layers subsequently follow the plurality of input layers and perform convolution on the plurality of input patches; and
  wherein the third region comprises a plurality of residual blocks, and the plurality of output convolution layers subsequently follow the plurality of residual blocks.

3. The method of claim 1, wherein adjusting the first resolution, the second resolution, and the third resolution comprises: aligning the first resolution, the second resolution, and the third resolution using the plurality of input layers in the first region.

4. The method of claim 3, wherein aligning the first resolution, the second resolution, and the third resolution comprises:

down-sampling the first input patch into a plurality of first input sub-patches having same resolution as the second input patch or the third input patch using the plurality of input layers in the first region; and
  the method further comprises:
  combining the plurality of first input sub-patches with the second input patch and the third input patch;
  generating a plurality of output patches corresponding to the plurality of input patches, wherein the plurality of output patches comprise a plurality of first output sub-patches, a second output patch, and a third output patch; and
  up-sampling the plurality of first output sub-patches using the plurality of output layers in the first region.

5. The method of claim 3, wherein aligning the first resolution, the second resolution, and the third resolution comprises:
  up-sampling the second output patch or the third output patch using the plurality of input layers in the first region; and
  down-sampling the second output patch or the third output patch using the plurality of output layers in the first region.

6. The method of claim 2, further comprising:
  loading the first input patch into a first input convolution layer in the second region and adjusting, by the first input convolution layer, the first resolution to align with the second resolution or the third resolution;
  loading the second input patch into a second input convolution layer in the second region and adjusting, by the second input convolution layer, the second resolution to align with the first resolution or the third resolution; and
  loading the third input patch into a third input convolution layer in the second region and adjusting, by the third input convolution layer, the third resolution to align with the first resolution or the second resolution.

7. The method of claim 6, wherein adjusting the first resolution to align with the second resolution or the third resolution comprises:
  scaling down, by the first input convolution layer with a stride size greater than a second input convolution layer or a third input convolution layer, the first resolution to align with the second resolution or the third resolution;
  wherein adjusting the second resolution to align with the first resolution or the third resolution comprises:
  scaling up, by a pixel shuffle layer in the second region, the second resolution to align with the first resolution or the third resolution;
  wherein adjusting the third resolution to align with the first resolution or the second resolution comprises:
  scaling up, by a pixel shuffle layer in the second region, the third resolution to align with the first resolution or the second resolution.

8. The method of claim 7, further comprising:
  scaling up, by a pixel shuffle layer in the second region, a resolution of a first output patch corresponding to the first input patch such that the first output patch has the same resolution as the first input patch;
  scaling down, by a resolution increase layer in the second region, a resolution of a second output patch corresponding to the second input patch such that the second output patch has the same resolution as the second input patch;
  scaling down, by a resolution increase layer in the second region, a resolution of a third output patch corresponding to the third input patch such that the third output patch has the same resolution as the third input patch.

9. The method of claim 2, further comprising:
loading the first input patch into a first input convolution layer in the second region, adjusting the first resolution, and generating a first convolution output;
loading the second input patch into a second input convolution layer in the second region, adjusting the second resolution, and generating a second convolution output;
loading the third input patch into a third input convolution layer in the second region, adjusting the third resolution, and generating a third convolution output;
generating a concatenated output by concatenating the first convolution output, the second convolution output, and third convolution output;
loading the concatenated output into a first residual block of the plurality of residual blocks and generating a residual output by a last residual block of the plurality of residual blocks;
respectively loading the residual output into the plurality of output convolution layers;
adjusting, by a first output convolution layer, a resolution of the residual output loaded to the first output convolution layer to align with the first resolution of the first input patch loaded into the first input convolution layer;
adjusting, by a second output convolution layer, a resolution of the residual output loaded to the second output convolution layer to align with the second resolution of the second input patch loaded into the second input convolution layer; and
adjusting, by a third output convolution layer, a resolution of the residual output loaded to the third output convolution layer to align with the third resolution of the third input patch loaded into the third input convolution layer.

10. The method of claim 2, wherein the neural network comprises a first input convolution layer, a second input convolution layer, and a third input convolution layer in the second region, and a concatenating layer;
wherein the plurality of residual blocks comprise one or more front residual blocks, one or more intermediate residual blocks, and one or more rear residual blocks, the one or more front residual blocks are followed by the one or more intermediate residual blocks that are followed by the one or more rear residual blocks; and
the method further comprises:
loading the first input patch into a first input convolution layer and generating a first convolution output;
loading the second input patch into a second input convolution layer and generating a second convolution output;
loading the third input patch into a third input convolution layer and generating a third convolution output;
concatenating the first convolution output, the second convolution output, and the third convolution output and generating a concatenated output;
loading the concatenated output to a first front residual block;
scaling down, by a first resolution scaling down residual block in the third region, the first resolution, wherein the first resolution scaling down residual block is one front residual block in the one or more front residual blocks; and
scaling up, by a first resolution scaling up residual block in the third region, the first resolution, wherein the first resolution scaling up residual block is one rear residual block in the one or more rear residual blocks.

11. The method of claim 10, further comprising:
scaling down, by a second resolution scaling down residual block in the third region, the second resolution or the third resolution, wherein the second resolution scaling down residual block is one front residual block in the one or more front residual blocks; and
scaling up, by a second resolution scaling up residual block in the third region, the second resolution or the third resolution, wherein the second resolution scaling up residual block is one rear residual block in the one or more rear residual blocks.

12. The method of claim 1, wherein the first QpMap value, the second QpMap value, and the third QpMap value are normalized by a dividing factor into the dynamic range that matches a QP value range associated with the first input patch, the second input patch, and the third input patch, and the QP value range is obtained by normalizing input QP values of the first input patch, the second input patch and the third input patch by the dividing factor.

13. The method of claim 1, wherein the input QP values are obtained by subtracting a first value from the input QP values of the current image that is inter-coded, wherein the first value is determined based on a temporal layer index of the current image that is inter-coded; or the input QP values are obtained through reference signaling.

14. The method of claim 1, wherein the plurality of map values are determined according to input QP values of the current image or QP step sizes corresponding to the input QP values, and
the method further comprises:
scaling the QP step sizes using a constant scaling factor.

15. The method of claim 1, further comprising:
generating, according to quantization parameter (QP) values of input channels of the current image, a plurality of QpMap values at a plurality of QpMap channels respectively corresponding to the input channels; and
scaling the plurality of input patches at the input channels by respectively concatenating the plurality of QpMap channels with the input channels.

16. The method of claim 1, further comprising at least one of following steps:
scaling, based on scaling factors, the plurality of input patches respectively at the input channels before loading the plurality of input patches to the neural network; or
scaling, based on scaling factors, the plurality of input patches respectively at the input channels after loading the plurality of input patches to the neural network.

17. The method of claim 1, further comprising at least one of following steps:
in response to determining that the image filtering in the video coding using the neural network is signaled to be turned on at a coding tree unit (CTU) level or a frame level, skipping deblocking filtering in the video coding;
in response to determining that the image filtering in the video coding using the neural network is signaled to be turned on at a CTU level or a frame level, turning off in-loop filters in the video coding; or
in response to determining that the image filtering in the video coding using the neural network is signaled to be turned on at a CTU level or a frame level, selectively turning off in-loop filters in the video coding.

18. An apparatus for image filtering in video coding, comprising:
- one or more processors; and
- a memory configured to store instructions executable by the one or more processors,
- wherein the one or more processors, upon execution of the instructions, are configured to:
- load a plurality of input patches associated with a current image to be coded, wherein the plurality of input patches comprise a first input patch with a first resolution, a second input patch with a second resolution, and a third input patch with a third resolution; and
- in response to determining that one resolution in the first resolution, the second resolution, and the third resolution is different from the other two resolutions, adjust the first resolution, the second resolution, and the third resolution at one region of a plurality of regions;
- wherein the one region of a plurality of regions comprises a first region; the first region comprises a plurality of input layers receiving the plurality of input patches before a neural network for image filtering and a plurality of output layers outputting a plurality of output patches after the neural network;
- wherein the one or more processors, upon execution of the instructions, are further configured to:
- load a plurality of quantization parameter (QP) map (QpMap) values at a plurality of QpMap channels, wherein the plurality of QpMap values comprise a first QpMap value at a first QpMap channel, a second QpMap value at a second QpMap channel, and a third QpMap value at a third QpMap channel; and
- adjust the first QpMap value, the second QpMap value, and the third QpMap value so that the first QpMap value, the second QpMap value, and the third QpMap value are within a dynamic range;
- wherein the first QpMap value, the second QpMap value, and the third QpMap value are evenly distributed at different positions of the dynamic range.

19. A non-transitory computer-readable storage medium for image filtering in video coding storing computer-executable instructions that, when executed by one or more computer processors, cause the one or more computer processors to perform acts comprising:
- loading a plurality of input patches associated with a current image to be coded, wherein the plurality of input patches comprise a first input patch with a first resolution, a second input patch with a second resolution, and a third input patch with a third resolution;
- in response to determining that one resolution in the first resolution, the second resolution, and the third resolution is different from the other two resolutions, adjusting the first resolution, the second resolution, and the third resolution at one region of a plurality of regions;
- wherein the one region of a plurality of regions comprises a first region; the first region comprises a plurality of input layers receiving the plurality of input patches before a neural network for image filtering and a plurality of output layers outputting a plurality of output patches after the neural network;
- loading a plurality of quantization parameter (QP) map (QpMap) values at a plurality of QpMap channels, wherein the plurality of QpMap values comprise a first QpMap value at a first QpMap channel, a second QpMap value at a second QpMap channel, and a third QpMap value at a third QpMap channel; and
- adjusting the first QpMap value, the second QpMap value, and the third QpMap value so that the first QpMap value, the second QpMap value, and the third QpMap value are within a dynamic range;
- wherein the first QpMap value, the second QpMap value, and the third QpMap value are evenly distributed at different positions of the dynamic range.

* * * * *